United States Patent
Henkel et al.

(10) Patent No.: US 8,772,963 B2
(45) Date of Patent: Jul. 8, 2014

(54) DEVICE FOR SUPPLYING UNINTERRUPTIBLE POWER

(75) Inventors: Hartmut Henkel, Blomberg (DE);
Michael Heinemann, Lage (DE);
Jochen Zeuch, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 0 days.

(21) Appl. No.: 12/959,122

(22) Filed: Dec. 2, 2010

(65) Prior Publication Data

US 2011/0074217 A1    Mar. 31, 2011

Related U.S. Application Data

(63) Continuation of application No. 10/599,812, filed as application No. PCT/EP2005/003481 on Apr. 2, 2005, now Pat. No. 7,872,373.

(30) Foreign Application Priority Data

Apr. 14, 2004   (DE) .......................... 10 2004 018 502

(51) Int. Cl.
*H02J 9/04* (2006.01)
*H02J 9/06* (2006.01)
*H02J 7/00* (2006.01)

(52) U.S. Cl.
CPC ... *H02J 9/04* (2013.01); *H02J 9/06* (2013.01);
*H02J 2007/0001* (2013.01)
USPC .......................................................... 307/64

(58) Field of Classification Search
CPC ................. H02J 9/00; H02J 9/04; H02J 9/06;
H02J 2007/0001
USPC .............................................. 307/64; 12/64
See application file for complete search history.

(56) References Cited

U.S. PATENT DOCUMENTS 4,393,430 A * 7/1983 Hughes ........................ 361/92
4,556,802 A  12/1985 Harada et al.
(Continued)

FOREIGN PATENT DOCUMENTS

| | | |
|---|---|---|
| EP | 0 954 081 A2 | 11/1999 |
| WO | 03/060746 A1 | 7/2003 |
| WO | 2004/012320 A2 | 2/2004 |

OTHER PUBLICATIONS

"International Preliminary Report on Patentability for International Application PCT/EP2005/003481", Feb. 8, 2007, Publisher: PCT International Bureau, Published in: CH.

(Continued)

*Primary Examiner* — Adi Amrany
(74) *Attorney, Agent, or Firm* — Kaplan Breyer Schwarz & Ottesen, LLP

(57) ABSTRACT

The invention relates to uninterruptible power supply devices which make it possible to supply emergency power to a load, which is to be supplied, in the event of mains failure. The invention is based on the object of providing a device for supplying uninterruptible power, which device can be operated in a more energy-saving manner and in which the emergency power can be controlled in a rapid and safe manner. To this end, the uninterruptible power supply device has a power transistor which can be rapidly switched and can be used to connect a standby power source to the output connections during emergency power operation. The output current can also be dynamically limited by driving the power transistor, which can be rapidly switched, in a corresponding manner. In addition, the input and output of the UPS device are decoupled using a field effect transistor that acts as a power transistor.

5 Claims, 1 Drawing Sheet

(56) References Cited

U.S. PATENT DOCUMENTS

| | | | |
|---|---|---|---|
| 4,564,767 | A | 1/1986 | Charych |
| 4,604,530 | A | 8/1986 | Shibuya |
| 4,745,299 | A | 5/1988 | Eng et al. |
| 4,779,007 | A | 10/1988 | Schlanger et al. |
| 4,788,450 | A | 11/1988 | Wagner |
| 5,138,185 | A * | 8/1992 | Weinstock ............. 307/66 |
| 5,315,533 | A | 5/1994 | Stich et al. |
| 5,579,197 | A | 11/1996 | Mengelt et al. |
| 5,612,580 | A | 3/1997 | Janonis et al. |
| 5,646,459 | A * | 7/1997 | Hatate et al. ............ 307/85 |
| 5,666,255 | A | 9/1997 | Muelleman |
| 5,737,204 | A | 4/1998 | Brown |
| 5,801,937 | A | 9/1998 | Gold et al. |
| 5,909,360 | A | 6/1999 | Lavin et al. |
| 6,040,640 | A | 3/2000 | Gehre et al. |
| 6,057,609 | A | 5/2000 | Nagai et al. |
| 6,094,363 | A | 7/2000 | Cheng |
| 6,122,181 | A | 9/2000 | Oughton, Jr. |
| 6,169,669 | B1 | 1/2001 | Choudhury |
| 6,172,478 | B1 | 1/2001 | Leppo et al. |
| 6,175,311 | B1 | 1/2001 | Li |
| 6,226,191 | B1 * | 5/2001 | Severinsky et al. ............ 363/40 |
| 6,329,796 | B1 | 12/2001 | Popescu |
| 6,400,043 | B1 | 6/2002 | Batson et al. |
| 6,400,591 | B2 | 6/2002 | Reilly et al. |
| 6,504,270 | B1 | 1/2003 | Matsushita |
| 6,507,507 | B2 | 1/2003 | Tokunaga et al. |
| 6,577,513 | B1 | 6/2003 | Chang et al. |
| 6,600,239 | B2 | 7/2003 | Winick et al. |
| 6,630,751 | B2 | 10/2003 | Curtis et al. |
| 6,643,152 | B2 | 11/2003 | Tokunaga et al. |
| 6,653,748 | B2 * | 11/2003 | Buchanan ............. 307/51 |
| 6,657,319 | B2 | 12/2003 | Sanada |
| 6,753,651 | B1 * | 6/2004 | Goral ............. 315/86 |
| 6,856,047 | B2 * | 2/2005 | Murabayashi et al. ....... 307/150 |
| 6,917,125 | B2 | 7/2005 | Yim |
| 6,977,448 | B2 * | 12/2005 | Kanouda et al. ............. 307/66 |
| 7,034,413 | B1 | 4/2006 | Zansky et al. |
| 7,112,896 | B2 * | 9/2006 | Kinnard ............. 307/43 |
| 7,157,810 | B2 * | 1/2007 | Kanouda et al. ............. 307/66 |
| 7,531,916 | B2 * | 5/2009 | Franklin et al. ............. 307/64 |
| 2002/0186576 | A1 * | 12/2002 | Kanouda et al. ............. 363/125 |
| 2002/0189906 | A1 | 12/2002 | Tominaga et al. |
| 2003/0052544 | A1 | 3/2003 | Yamamoto et al. |
| 2004/0164617 | A1 | 8/2004 | Bobb et al. |
| 2005/0105229 | A1 * | 5/2005 | Deng et al. ............. 361/90 |

OTHER PUBLICATIONS

"USPTO Office Action for U.S. Appl. No. 10/599,812 dated Mar. 18, 2008",, Publisher: United States Patent and Trademark Office, Published in: USA.

"USPTO Office Action for U.S. Appl. No. 10/599,812 dated Jul. 27, 2009",, Publisher: United States Patent and Trademark Office, Published in: USA.

"USPTO Office Action for U.S. Appl. No. 10/599,812 dated Jan. 15, 2010",, Publisher: United States Patent and Trademark Office, Published in: USA.

"USPTO Office Action for U.S. Appl. No. 10/599,812 dated May 3, 2010",, Publisher: United States Patent and Trademark Office, Published in: USA.

"USPTO Office Action for U.S. Appl. No. 10/599,812 dated Aug. 18, 2010",, Publisher: United States Patent and Trademark Office, Published in: USA.

"Definition of 'Current Limiter [ELECTR]'", "McGraw-Hill Dictionary of Scientific and Technical Terms 6th Edition", 2003, p. 527 6th Ed, Publisher: The McGraw-Hill Companies, Inc., Published in: US.

* cited by examiner

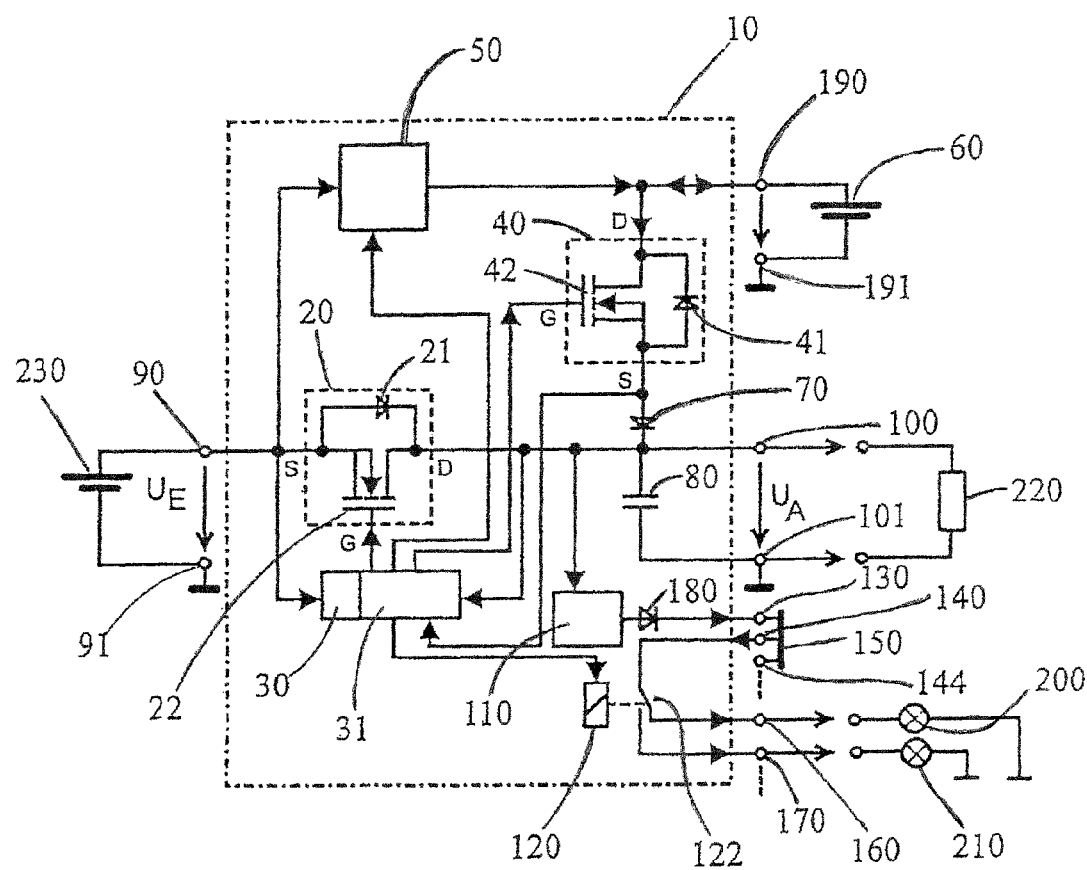

DEVICE FOR SUPPLYING UNINTERRUPTIBLE POWER

CROSS REFERENCE TO RELATED APPLICATIONS

This application claims priority to and is a Continuation application of U.S. patent application Ser. No. 10/599,812, with a U.S. filing date of Oct. 10, 2006, now U.S. Pat. No. 7,872,373. U.S. application Ser. No. 10/599,812 is a 371 filing of PCT/EP2005/003481, filed on Apr. 2, 2005 hich in turn claims priority of German Application Number 10 2004 018 502.6, filed on Apr. 14, 2004.

Furthermore, U.S. patent application Ser. No. 10/599,812 is incorporated herein by reference.

FIELD ON THE INVENTION

The present invention relates to electronics in general, and, more particularly, to a device for supplying uninterruptible power.

BACKGROUND OF THE INVENTION

In order to ensure the functionality of electronic devices and systems, for example private computer networks, even in the event of mains failure, so-called UPS (uninterruptible power supply) systems are used. UPS systems ensure that, in the event of the mains voltage failing, the electronic devices or systems are supplied with emergency power via the UPS system. In other words, a UPS system ensures that, in the event of a fault in the mains supply, the system changes over from mains operation to emergency power operation. As soon as the mains supply starts operating again, the UPS system changes over from emergency power operation to mains operation.

SUMMARY OF THE INVENTION

The invention is based on the object of providing a device for supplying uninterruptible power, which device can be operated with a lower power loss than conventional UPS devices. Another aspect of the invention resides in a measure for limiting the output current during emergency power operation. Yet another aspect of the invention resides in making it easier for a user to connect further electrical or electronic components.

A device for supplying uninterruptible power (also referred to as UPS device for short) is provided, said device having input connections for connection to a primary power supply device, connections for connecting a standby power source, first output connections for connecting a load, a device for decoupling the input connections from the first output connections in the event of a fault in the primary power supply device, a first controllable switching device for connecting the standby power source to the first output connections in a controlled manner in the event of a fault in the primary power supply device, and a control device which is assigned to the first controllable switching device. In addition, the first controllable switching device has a power transistor which can be rapidly switched. A monitoring device is also provided for the purpose of monitoring the output current flowing through the power transistor which can be rapidly switched. The control device is designed to pulse-width-modulate the power transistor, which can be rapidly switched, on the basis of the current being monitored in order to limit the current which can be provided by the standby power source during emergency power operation.

It shall be mentioned, at this juncture, that the primary power supply device may be, for example, a DC power supply unit or a supply system which provides alternating voltages. The standby power source may contain one or more rechargeable batteries. However, the standby power source may also contain an AC current source.

In order to be able to prevent a current from flowing to the standby power source, via the power transistor which can be rapidly switched, during mains operation, a diode is connected in series with the rapid power transistor, said diode being operated in the forward direction during emergency power operation and being operated in the reverse direction during mains operation.

In order to smooth the output voltage from the UPS device, a capacitor is connected between the first output connections. The capacitor is used, in particular, to smooth the pulse-width-modulated current provided by the power transistor, which can be rapidly switched, during emergency power operation. In addition, the capacitor ensures that, when changing over from mains operation to emergency power operation, the switching delays which occur in the process are compensated for.

The input and output of the UPS device are generally decoupled using conventional diodes or Schottky diodes. The diodes are connected in such a manner that they forward the input current to the output of the UPS device during mains operation. During emergency power operation, they prevent the emergency current from being able to branch to the input of the UPS device. The disadvantage of conventional diodes or Schottky diodes is that a relatively high power loss, which results from the product of the forward voltage and the supply current, is dropped across these diodes during mains operation. In order to be able to reduce the power loss of the decoupling device during mains operation, a second controllable switching device, preferably a field effect transistor that acts as a power transistor, is connected in parallel with the diode. In the on state, a smaller voltage is dropped across such a field effect transistor than across a conventional diode, with the result that the power loss is considerably reduced in comparison with the use of a diode. Thanks to the reduction in the power loss in the decoupling device, smaller heat sinks may be used, thus resulting in a lower production expenditure on the UPS device. In this case, the monitoring device is designed to monitor an input voltage, the control device disconnecting the second controllable switching device if the input voltage being monitored signals a fault in the primary power supply device.

It shall be mentioned, at this juncture, that a fault in the primary power supply device is understood as meaning impermissible voltage fluctuations, but in particular total failure of the primary power supply device.

If the standby power source is a rechargeable battery, a charging device which charges the standby power source during mains operation and can be controlled by the control device is connected between the input connections and the chargeable standby power source. The charging device is assigned a rectifier if the primary power supply device provides an alternating current. The rectifier may be advantageously connected between the input connections and the decoupling device. If the rectifier is provided at another location, the second controllable switching device needs to be in the form of a bidirectional switch.

In order to be able to increase the performance of the UPS device, a current-limited supply output which is operational both during mains operation and during emergency power operation is provided in parallel with the first output connections. The supply output is connected to the first output connections via a current limiter. The current limiter may have a rectifier which can be connected if the input voltage is an alternating voltage. The current limiter is also connected in series with a diode which passes a current to the current-limited supply output but blocks a current coming from the supply output. This prevents feedback from the UPS device.

Depending on the customer's wishes, external devices, for example state signaling devices, may be operated in conjunction with the current-limited supply output. To this end, the UPS device has at least one third controllable switching device which is preferably a relay, for example a changeover relay, and is intended to connect and disconnect at least one state signaling device. The state signaling device can be connected to a respective second output connection which is assigned to the third controllable switching device, a third output connection which is assigned to the third controllable switching device being arranged at a predetermined distance from the current-limited supply output. This makes it possible to use a predefined contact bridge to short-circuit the current-limited supply output to the third output connection. This makes it possible for relays and state signaling devices to be wired in a simple and safe manner, and incorrect wiring is prevented.

A device for supplying uninterruptible power according to the characterizing part has a parallel circuit comprising a diode and a second controllable switching device which form the decoupling device. A monitoring device is also provided for the purpose of monitoring an input voltage. The control device of the UPS device disconnects the second controllable switching device if the input voltage being monitored signals a fault in the primary power supply device.

The second controllable switching device may be a power transistor, in particular a field effect transistor. As already mentioned further above, the advantage of the use of a field effect transistor that is connected in parallel with the diode can be seen in the fact that the power loss can be reduced during mains operation.

A device for supplying uninterruptible power is also disclosed, which device has a current-limited supply output which is connected in parallel with the first output connections.

This makes it possible to improve the performance of the UPS device since electrical devices, for example state signaling devices, can be connected in a simple and safe manner.

At least one second controllable switching device is preferably provided for the purpose of connecting and disconnecting at least one state signaling device which can be connected to a respective second output connection that is assigned to the second switching device. At least one third output connection which is assigned to the second switching device is also arranged at a predetermined distance from the current-limited supply output.

This makes it possible to use a predefined contact bridge to short-circuit the current-limited supply output to the at least one third output connection. Arranging the current-limited supply output in a well-defined manner with respect to the third output connections makes it possible for the second switching device to be wired in a simple and safe manner. The second controllable switching device is a relay, preferably a changeover relay.

BRIEF DESCRIPTION OF THE DRAWINGS

The single FIGURE shows a device for supplying uninterruptible power.

DETAILED DESCRIPTION

The single FIGURE shows a device for supplying uninterruptible power (UPS), which is referred to below as UPS device for short. The UPS device is generally provided with the reference symbol 10. On the input side, the UPS device 10 has two input terminals 90, 91 to which a primary power supply device 230 is connected, said power supply device providing a DC voltage $U_E$ in the present example. The primary power supply device 230 may be a 24 V power supply unit or a 24 V power system. On the output side, the UPS device 10 has two output terminals 100 and 101 to which a load 220 to be supplied is connected. A decoupling device 20 is connected between the input terminal 90 and the output terminal 100. The decoupling device 20 has a parallel circuit comprising a diode and a field effect transistor 24 which is operated as a power transistor. The cathode connection is connected to the output terminal 100, whereas the anode connection of the diode 21 is connected to the input connection 90. The source connection S of the field effect transistor 22 is connected to the anode connection of the diode 21, whereas the drain connection D of the field effect transistor 22 is connected to the cathode connection of the diode 21. The gate connection G of the field effect transistor 22 is connected to a control and monitoring device 30, 31. The control and monitoring device 30, 31 is designed in such a manner that it switches on the field effect transistor 22, via the gate connection G, during mains operation and switches it off during emergency power operation. On the input side, the control and monitoring device 30, 31 is connected to the source connection S and to the drain connection D of the field effect transistor 22 in order to be able to monitor and evaluate the input voltage of the UPS device 10. The control and monitoring device 30, 31 drives the gate connection G of the field effect transistor 22 on the basis of the input voltage being monitored in order to reduce the power loss during mains operation. To this end, the field effect transistor 22 is switched on using the control and monitoring device 30, 31 during mains operation, thus bridging the diode 21.

The UPS device 10 also has two input terminals 190 and 191 to which a standby power source 60 is connected. As in the present example, the standby power source 60 may be a rechargeable battery. In this case, a charging unit 50 which charges the rechargeable battery 60 during mains operation is connected between the input terminal 90 and the connection terminal 190. The charging unit 50 is a device which is known per se and automatically detects when the rechargeable battery 60 has been charged. The charging device 50 is likewise driven, using the control and monitoring device 30, 31, in such a manner that the rechargeable battery 60 is not charged during emergency power operation. It shall be mentioned, at this juncture, that the charging device 50 provides a plurality of functions. It is thus used, first of all, to limit the charging current of the rechargeable battery 60. It also adapts the charging voltage to the requirements of the rechargeable battery 60 during charging. Charging is ended when, for example, the primary power supply device 230 has to provide a maximum load current. Battery charging is likewise switched off when the rechargeable battery 60 has been charged.

A further switching device 40 is connected in series with a diode 70 between the connection terminal 190 and the output terminal 100. The switching device 40 contains a power transistor 42 which can be rapidly switched and is in the form of a field effect transistor 42 that is illustrated together with the production-dictated inverse diode 41. In this embodiment variant, the drain connection D is connected to the connection terminal 190, while the source connection S of the field effect transistor 42, which can be rapidly switched, is connected to the anode connection of the diode 70. The cathode connection of the diode 70 is connected to the output terminal 100. The gate connection G of the field effect transistor 42, which can be rapidly switched, is connected to an output of the control and monitoring device 30, 31. The diode 70 is connected in such a manner that it is forward-biased during emergency power operation and is reverse-biased during mains operation so that charging of the rechargeable battery 60 during mains operation is prevented using the switching device 40. A capacitor 80 which smoothes, in particular, the voltage provided by the rechargeable battery 60 during emergency power operation is connected between the output terminals 100 and 101. Together with the diode 70, the switching device 40 is used not only to decouple the rechargeable battery 60 from the output terminals 100 and 101 but also to limit the emergency current during emergency power operation. To this end, the emergency current, that is to say the current of emergency power operation which flows through the field effect transistor 42, is monitored and evaluated by the control and monitoring device 30, 31. Depending on the emergency current measured, the field effect transistor 42 which can be rapidly switched is pulse-width-modulated via the gate electrode G, thus making it possible to reduce the current.

At this juncture, it shall be briefly pointed out that it is irrelevant to the invention whether the standby power source 60, which can also be referred to as a standby voltage source in an equivalent manner, is an internal part of the UPS device 10 or, as illustrated in the FIGURE, can be externally connected.

According to another aspect of the invention, a current-limited supply output 130 is provided in parallel with the output terminals 100 and 101. The supply output 130 is connected to the output terminal 100 via a diode 180 and a current limiter 110. The cathode connection of the diode 180 is connected to the supply output 130, whereas the anode connection of the diode 180 is connected to the output of the current limiter 110. This avoids feedback from the UPS device 10 via the supply output 130.

The UPS device 10 preferably also has a changeover relay whose exciter circuit, which is symbolically illustrated, bears the reference symbol 120, while the output circuit of the changeover relay is labeled using the reference symbol 122. On the output side, the exciter circuit 120 of the changeover relay is connected to the control and monitoring device 30, 31. In the present example, the output circuit 122 has three connections 140, 160 and 170. A respective light-emitting diode 200 and 210 can be connected to the connections 160 and 170 in order to signal the state of the UPS device 10. For example, the light-emitting diode 200 signals that the UPS device 10 is operating with mains operation, while lighting-up of the light-emitting diode 210 can signal that the UPS device 10 is operating with emergency power operation. The further connection contact 140 of the output circuit 122 is arranged at a firmly prescribed distance from the supply output 130. A correspondingly defined insertable jumper 150 can be used to short-circuit the supply output 130 to the output terminal 140 of the output circuit 122. This makes it possible for the output circuit 122 of the changeover relay to be supplied, in a fault-free and safe manner, either with the input voltage $U_E$ during mains operation or via the rechargeable battery 60 during emergency power operation. The method of operation of a changeover relay is generally known, with the result that it is possible to dispense with a detailed description.

As already mentioned, the field effect transistor 42 is also used to limit the load current during emergency power operation. If the control and monitoring device 30, 31 detects that the current through the field effect transistor 42 is becoming too large, the power switch 40 is switched off. After a short pause, the field effect transistor 42 is switched on again. The switch-on and switch-off cycle depends on the magnitude of the monitored current through the drain-source path of the field effect transistor 42, which is monitored and evaluated by the control and monitoring device 30, 31. The control and monitoring device 30, 31 ensures, in conjunction with the field effect transistor 42, that, during emergency power operation, high short-circuit currents can be limited in a considerably faster and more reliable manner than is the case when using relays, for example. In order to prevent the rechargeable battery 60 from being charged during mains operation, the diode 70 is provided since field effect transistors cannot block inverse voltages, as is symbolically indicated using the inverse diode 41. Thanks to the dynamic current limitation with the aid of the control and monitoring device 30, 31 and the field effect transistor 42, the output characteristic curve of the UPS device 10 can be adapted to the conventional output characteristic curve of power supplies and a peak current can be limited early and reliably.

The method of operation of the UPS device 10 will be explained briefly below.

For the sake of simpler explanation, it shall be assumed that a DC voltage $U_E$, for example a 24 V DC voltage, is applied to the input terminals 90 and 91. The input voltage is tapped off, monitored and evaluated by the control and monitoring device 30, 31 at the source connection S and drain connection D of the field effect transistor 22. As long as the input voltage $U_E$ is within a prescribed tolerance range, the UPS device 10 operates with mains operation. This means that the field effect transistor 22 is held in the on state via the gate connection G. If the rechargeable battery 60 has not been fully charged, the charging device 50 is used to charge the rechargeable battery 60. During mains operation, the field effect transistor 42 which is required for current limitation is held in the off state using the control and monitoring device 30, 31. The diode 70 which is connected in series with the field effect transistor 42 prevents an undesirable flow of current to the rechargeable battery 60 via the field effect transistor 42. As soon as the control and monitoring device 30, 31 detects a disturbance in the input voltage $U_E$ (this may be undesirable voltage fluctuations or the complete failure of the primary power supply device 230), the field effect transistor 22 is switched off via the gate connection G so that the input terminals 90, 91 and the output terminals 70, 100 and 101 are decoupled. At the same time, the field effect transistor 42 is switched on using the control and monitoring device 30, 31 so that the load 220 which is connected to the output terminals 100 and 101 is now supplied with emergency power via the rechargeable battery 60. During emergency power operation, the control and monitoring device 30, 31 monitors the current flowing through the field effect transistor 42 in order to limit said current if necessary. As already mentioned, the output current of the field effect transistor 42 is limited by the control and monitoring device 30, 31 pulse-width modulating the output current via the gate connection G, i.e. the switch-on and switch-off cycle of the field effect transistor 42 determines the output current of the latter.

As already mentioned, the control and monitoring device informs the exciter circuit 120 of the changeover relay of the change from mains operation to emergency power operation so that the respective state can be indicated to the user using the light-emitting diode 200 or 210.

It shall be pointed out, at this juncture, that additional relays or else changeover relays can be connected to the control and monitoring device 30, 31. The corresponding output connections of the respective output circuits are arranged at defined distances from the supply output 140 in order to make it possible, in a simple and fault-protected manner, to connect the relays or the output circuits of the relays in parallel using the insertable jumper 150.

What is claimed is:

1. A device for supplying uninterruptible power, said device comprising:
    input connections for connection to a primary DC voltage supply device;
    standby-power connections for connecting a standby power source;
    first-output connections for connecting a load;
    a supply output that is connected in parallel with the first-output connections;
    a device for decoupling the input connections from the first-output connections and from the supply output in the event of a fault in the primary DC voltage supply device, wherein the device for decoupling comprises a first diode that has i) an anode connection that is directly electrically connected to one of the input connections and ii) a cathode connection that is directly electrically connected to one of the first-output connections;
    a first controllable switching device for connecting the standby power source to the first-output connections and to the supply output in a controlled manner in the event of a fault in the primary DC voltage supply device, the first controllable switching device comprising a power transistor;
    a control device that is i) assigned to the first controllable switching device and ii) directly electrically connected to the gate terminal of the power transistor;
    a current limiter for limiting current to the supply output, wherein the current limiter restricts the flow of current to the supply output to a certain amount, and wherein the current limiter is connected in series with a second diode that is directly electrically connected to the supply output, wherein the second diode passes current from the current limiter to the supply output and blocks current coming from the supply output in order to prevent feedback to the device for supplying uninterruptible power;
    a second-output connection for connecting a state signalling device;
    a connection contact for connecting the supply output with the second-output connection, wherein the connection contact is arranged at a predetermined distance from the supply output, and wherein the supply output and the connection contact are capable of being short-circuited by a predefined insertable contact bridge;
    and
    a second controllable switching device configured to connect, to each other, and disconnect, from each other, the connection contact and the second-output connection, wherein the second controllable switching device is controlled by the control device.

2. The device for supplying uninterruptible power as claimed in claim 1 wherein the second controllable switching device is a relay.

3. The device for supplying uninterruptible power as claimed in claim 1 wherein the second controllable switching device is a changeover relay.

4. The device for supplying uninterruptible power as claimed in claim 1, wherein the control device is in communications with a monitoring device, wherein the monitoring device is provided for monitoring output current flowing through the power transistor.

5. The device for supplying uninterruptible power as claimed in claim 4, wherein the control device is designed to pulse-width modulate the power transistor on the basis of the current being monitored in order to limit the current that is provided by the standby power source.

* * * * *